United States Patent
Orihashi et al.

(10) Patent No.: US 7,354,668 B2
(45) Date of Patent: Apr. 8, 2008

(54) OPERATION STATE DETERMINING APPARATUS AND METHOD FOR FUEL CELL

(75) Inventors: Nobuyuki Orihashi, Toyota (JP); Masaaki Kondo, Owariasahi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 733 days.

(21) Appl. No.: 10/763,319

(22) Filed: Jan. 26, 2004

(65) Prior Publication Data
US 2004/0151956 A1 Aug. 5, 2004

(30) Foreign Application Priority Data
Feb. 5, 2003 (JP) ............................. 2003-028493

(51) Int. Cl.
*H01M 8/04* (2006.01)
(52) U.S. Cl. .............................. 429/13; 429/22; 429/23
(58) Field of Classification Search ...................... None
See application file for complete search history.

(56) References Cited

U.S. PATENT DOCUMENTS 5,939,218 A * 8/1999 Mizuno ........................ 429/23
6,376,111 B1 4/2002 Mathias et al.

FOREIGN PATENT DOCUMENTS

| DE | 100 65 460 A1 | 8/2001 |
| JP | A 6-310161 | 11/1994 |
| JP | A 9-245826 | 9/1997 |
| JP | A 2000-243418 | 9/2000 |
| JP | A 2001-148253 | 5/2001 |

\* cited by examiner

*Primary Examiner*—Jonathan Crepeau
(74) *Attorney, Agent, or Firm*—Oliff & Berridge, PLC

(57) ABSTRACT

An operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas is characterized by comprising: a voltage measuring portion that measures a voltage of at least one of the unit cells or a voltage of a unit cell stack formed by stacking a plurality of unit cells; and an operation state determining portion which determines that the operation state is a first operation state that is one of a low fuel gas state and a dried-up state if the voltage measured by the voltage measuring portion is within a predetermined inappropriate voltage range, and is below a predetermined voltage that is pre-set at a low value that is substantially impossible during a low oxidizing gas state and during a flooded state, and which determines that the operation state is a second operation state that is one of the low oxidizing gas state and the flooded state if the voltage measured by the voltage measuring portion is within the inappropriate voltage range, and is above the predetermined voltage.

18 Claims, 9 Drawing Sheets

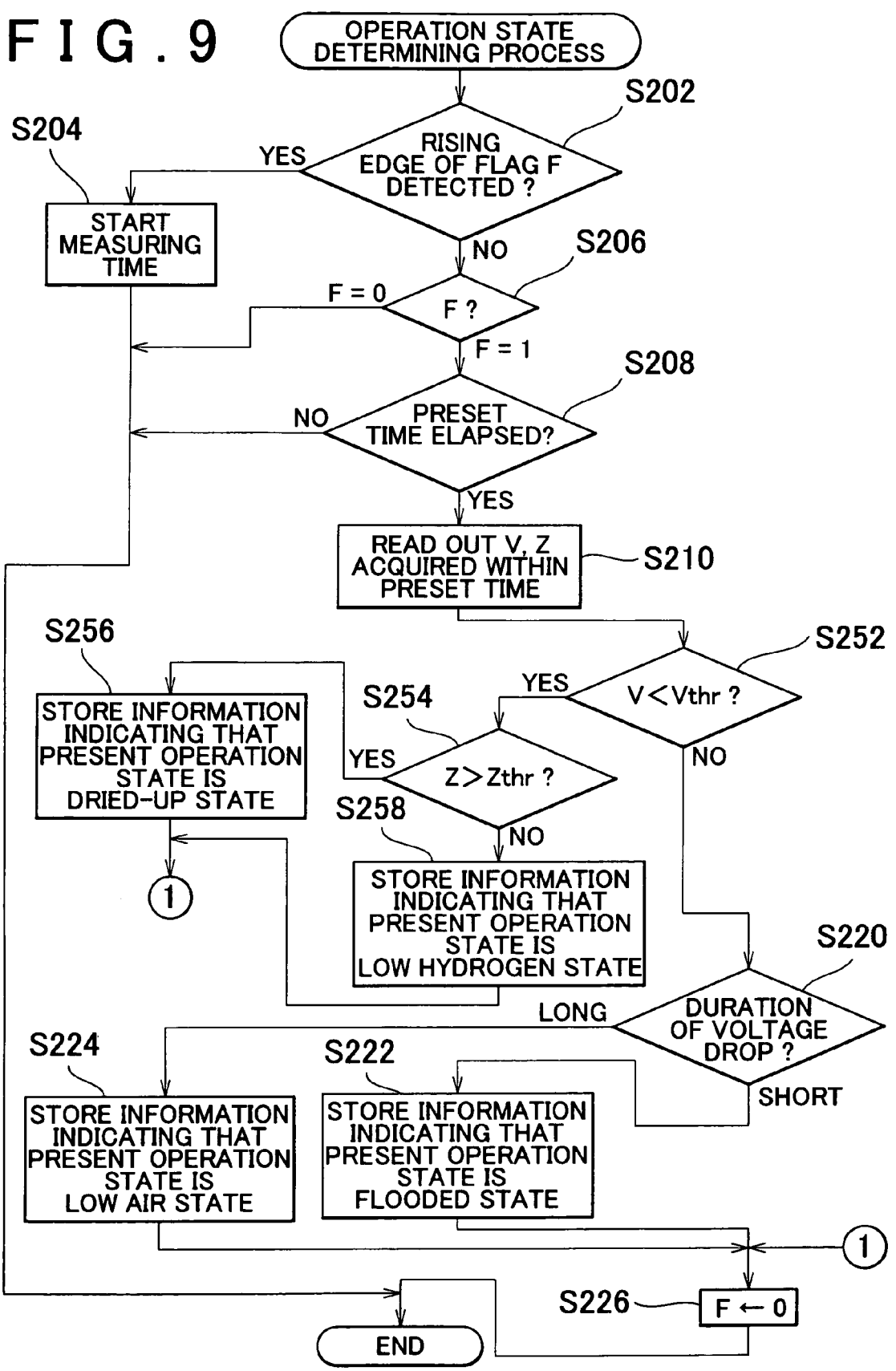

100## OPERATION STATE DETERMINING APPARATUS AND METHOD FOR FUEL CELL

INCORPORATION BY REFERENCE

The disclosure of Japanese Patent Application No. 2003-028493 filed on Feb. 5, 2003, including the specification, drawings and abstract, is incorporated herein by reference in its entirety.

BACKGROUND OF THE INVENTION

1. Field of the Invention

The invention relates to operation state determining apparatus and method for determining the state of operation of a fuel cell battery formed by stacking a plurality of unit cells.

2. Description of the Related Art

A related-art apparatus for determining the state of operation of a fuel cell battery is disclosed in Japanese Patent Application Laid-Open Publication No. 6-310161. This apparatus determines that the amount of fuel gas has abnormally reduced, if the output voltage of at least one of the unit cells that form the fuel cell battery has dropped below a predetermined value. Then, the apparatus stops the operation of the fuel cell battery in order to protect the fuel cell battery.

The phenomenon that the output voltage of a unit cell drops below a predetermined value (i.e., an output voltage during an appropriate state of operation) occurs not only in the case where the fuel gas has abnormally reduced, that is, the fuel gas is insufficient in amount, but also in the case where the oxidizing gas is insufficient in amount, the case where a solid electrolyte membrane of a unit cell becomes excessively dry (dried-up state), and the case where a fuel gas channel or an oxidizing gas channel of a unit cell has water droplets (flooded state). Therefore, mere detection of the output voltage of a unit cell decreasing below the predetermined value does not allow detailed knowledge of the state of operation of the fuel cell battery.

The invention has been accomplished in view of the aforementioned problems. It is an object of the invention to provide operation state determining apparatus and method that allow acquisition of detailed knowledge of the state of operation of a fuel cell battery.

SUMMARY OF THE INVENTION

In order to achieve the aforementioned object, the operation state determining apparatus and method for a fuel cell of the invention adopt the following means.

One aspect of the invention is an operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, the apparatus including: a voltage measuring portion that measures a voltage of at least one of the unit cells or a voltage of a unit cell stack formed by stacking a plurality of unit cells; and an operation state determining portion which determines that the operation state is a first operation state that is one of a low fuel gas state and a dried-up state if the voltage measured by the voltage measuring portion is within a predetermined inappropriate voltage range, and is below a predetermined voltage that is pre-set at a low value that is substantially impossible during a low oxidizing gas state and during a flooded state, and which determines that the operation state is a second operation state that is one of the low oxidizing gas state and the flooded state if the voltage measured by the voltage measuring portion is within the inappropriate voltage range, and is above the predetermined voltage.

This operation state determining apparatus measures the voltage of a unit cell or the voltage of a unit cell stack. If the measured voltage is within the predetermined inappropriate voltage range and is below the predetermined voltage, the operation state determining apparatus determines that the operation state is the first operation state (the low fuel gas state or the dried-up state). If the measured voltage is within the predetermined inappropriate voltage range and is above the predetermined voltage, the operation state determining apparatus determines that the operation state is the second operation state (the low oxidizing gas state or the flooded state). Therefore, this apparatus is able to acquire detailed knowledge of the operation state of the fuel cell battery, compared with the related-art apparatuses.

Either one of the determination as to whether the measured voltage is within the inappropriate voltage range and the determination as to whether the measured voltage is below the predetermined voltage may be executed prior to the other. If a measured voltage is below the predetermined voltage, the measured voltage is naturally within the inappropriate voltage range. Therefore, if a measured voltage is below the predetermined voltage, it is possible to omit subsequent determination as to whether the measured voltage is within the inappropriate voltage range. The "inappropriate voltage range" may be, for example, set lower than a range of voltages that the fuel cell battery can possibly produce during an appropriate operation state, or may also be set in a range of variation that is greater than the range of variation of voltage that is possible during an appropriate operation state of the fuel cell battery. The "predetermined voltage" may be determined based on an empirical value that is empirically determined as a voltage value that cannot be assumed during the low oxidizing gas state or during the flooded state, and that can be assumed during the low fuel gas state and during the flooded state. Specifically, it is preferable that the predetermined voltage be set at a value that is at most 0[V]. It is particularly preferable that the predetermined voltage be set within the range of −0.2 to 0 [V].

In the operation state determining apparatus, the operation state determining portion may determine which one of the first operation state and the second operation state is the operation state based on voltages measured by the voltage measuring portion a plurality of times during a period of a predetermined determination time after it is determined that a voltage measured by the voltage measuring portion is within the inappropriate voltage range. Therefore, the operation state can be appropriately determined, taking time-dependent voltage changes into consideration.

In the operation state determining apparatus, if the operation state is the second operation state, the operation state determining portion determined that the operation state is the flooded state, when the voltage drops and the duration of that voltage drop is short, and the operation state determining portion determines that the operation state is the low oxidizing gas state, when the duration is long. According to the findings acquired in conjunction with the invention, the measured voltage exhibited a tendency of rising in a short time after entering the inappropriate voltage range if the operation state of the fuel cell battery was the flooded state. If the operation state was the low oxidizing gas state, the measured voltage exhibited a tendency of entering the inappropriate voltage range and then remaining at a substantially constant value, with or without a voltage rise that follows. Therefore, the determination as to whether the duration of the voltage drop is short or long allows appropriate discrimination between the flooded state and the low oxidizing gas state.

The operation state determining apparatus may further include an impedance measuring portion that measures an impedance of at least one of the unit cells or an impedance of the unit cell stack. In this construction, if the operation state is the first operation state and the impedance measured by the impedance measuring portion is not within a predetermined appropriate impedance range, the operation state determining portion determines that the operation state is the dried-up state. If the operation state is the first operation state and the impedance measured by the impedance measuring portion is within the predetermined appropriate impedance range, the operation state determining portion determines that the operation state is the low fuel gas state. Therefore, discrimination between the dried-up state and the low fuel gas state can be appropriately accomplished whereas it is difficult to accomplish the discrimination therebetween based only on measured voltages.

Another aspect of the invention is an operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, the method including: (a) the step of determining whether a voltage of at least one of the unit cells or a voltage of a unit cell stack formed by stacking a plurality of unit cells is within a predetermined inappropriate voltage range; (b) the step of determining whether the voltage is below a predetermined voltage that is pre-set at a low value that is substantially impossible during a low oxidizing gas state and during a flooded state; and (c) the step of determining that the operation state is a first operation state that is one of a low fuel gas state and a dried-up state if the voltage is within the inappropriate voltage range, and is below the predetermined voltage, and determining that the operation state is a second operation state that is one of the low oxidizing gas state and the flooded state if the voltage is within the inappropriate voltage range, and is above the predetermined voltage.

This operation state determining method may further include (d) the step of determining whether an impedance of at least one of the unit cells or an impedance of the unit cell stack is within a predetermined appropriate impedance range. In the step (c), if the operation state is the first operation state and the impedance is not within a predetermined appropriate impedance range, it is determined that the operation state is the dried-up state. Furthermore in the step (c), if the operation state is the first operation state and the impedance is within the predetermined appropriate impedance range, it is determined that the operation state is the low fuel gas state.

Still another aspect of the invention is an operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, the apparatus including: an impedance measuring portion that measures an impedance of at least one of the unit cells or an impedance of a unit cell stack formed by stacking a plurality of unit cells; a voltage measuring portion that measures a voltage of at least one of the unit cells or a voltage of the unit cell stack; and an operation state determining portion that determines which one of a low fuel gas state, a low oxidizing gas state, a flooded state and a dried-up state is the operation state based on the impedance measured by the impedance measuring portion and the voltage measured by the voltage measuring portion.

This operation state determining apparatus measures the impedance of a unit cell or a unit cell stack, and also measures the voltage of a unit cell or a unit cell stack. On the basis of the measured impedance and the measured voltage, the apparatus determines which one of the low fuel gas state, the low oxidizing gas state, the flooded state and the dried-up state is the operation state. Therefore, detailed information can be acquired regarding the operation state of the fuel cell battery, compared with the case where the operation state is determined only on the basis of the measured impedance or the case where the operation state is determined on the basis of only the measured voltage. It is to be noted herein that the order in which the determination based on the measured impedance and the determination based on the measured voltage are executed is not particularly limited.

In the above-described operation state determining apparatus, the operation state determining portion may determine which one of the low fuel gas state, the low oxidizing gas state, the flooded state and the dried-up state is the operation state based on impedances measured by the impedance measuring portion a plurality of times and voltages measured by the voltage measuring portion a plurality of times during a period of a predetermined determination time after it is determined that a voltage measured by the voltage measuring portion is within a predetermined inappropriate voltage range. Therefore, the operation state can be appropriately determined, taking time-dependent changes in the voltage into consideration.

In the operation state determining apparatus, the operation state determining portion may determine that the operation state is the dried-up state if the impedance measured by the impedance measuring portion is not a predetermined appropriate impedance. In this manner, discrimination between the dried-up state and the low fuel gas state can be appropriately accomplished whereas it is difficult to accomplish discrimination therebetween based only on the measured voltage. Furthermore, if the impedance measured by the impedance measuring portion is the appropriate impedance, the operation state determining portion may determine which one of the low fuel gas state, the low oxidizing gas state and the flooded state is the operation state based on the voltage measured by the voltage measuring portion. If the measured impedance is the appropriate impedance, that is, if the operation state is not the dried-up state, the operation state is one of the low fuel gas state, the low oxidizing gas state and the flooded state. The determination as to which one of these states is the operation state can be appropriately accomplished on the basis of only the measured voltage. Still further, the operation state determining portion may determine that the operation state is the low fuel gas state if the impedance measured by the impedance measuring portion is the appropriate impedance and the voltage measured by the voltage measuring portion is below a predetermined voltage that is pre-set at a low value that is substantially impossible during the low oxidizing gas state and during the flooded state. If the measured impedance is the appropriate impedance, that is, if the operation state is not the dried-up state, it can be determined whether the operation state is the low fuel gas state or one of the other states on the basis of whether the measured voltage is below the predetermined voltage.

In the operation state determining apparatus, the operation state determining portion may determine that the operation state is the flooded state in a case where the voltage measured by the voltage measuring portion drops into a predetermined inappropriate voltage range, but remains above a predetermined voltage that is pre-set at a low value that is substantially impossible during the low oxidizing gas state and during the flooded state, and the duration of the voltage drop is short. Furthermore, the operation state determining portion may determine that the operation state is the low oxidizing gas state in a case where the voltage measured by the voltage measuring portion drops into a predetermined inappropriate voltage range, but remains above a predetermined voltage that is pre-set at a low value that is substantially impossible during the low oxidizing gas state and during the flooded state, and the duration of the voltage drop is long. According to the findings acquired in conjunction with the invention, the measured voltage exhibited a tendency of rising in a short time after entering the inappropriate voltage range if the operation state of the fuel cell battery was the flooded state. In contrast, if the operation state was the low oxidizing gas state, the measured voltage exhibited a tendency of entering the inappropriate voltage range and then remaining at a substantially constant value, with or without a voltage rise that follows. Therefore, the determination as to whether the duration of the voltage drop is short or long allows appropriate discrimination between the flooded state and the low oxidizing gas state.

A further aspect of the invention is an operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, the method including the steps of: measuring an impedance of at least one of the unit cells or an impedance of a unit cell stack formed by stacking a plurality of unit cells; measuring a voltage of at least one of the unit cells or a voltage of the unit cell stack; and determining which one of a low fuel gas state, a low oxidizing gas state, a flooded state and a dried-up state is the operation state based on the impedance and the voltage. Therefore, this method allows acquisition of detailed knowledge of the operation state of the fuel cell battery, in comparison with the case where the operation state is determined on the basis of only the measured impedance, or the case where the operation state is determined on the basis of only the measured voltage. It is to be noted herein that the order in which the determination based on the measured impedance and the determination based on the measured voltage are executed is not particularly limited.

A yet further aspect of the invention is an operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, the apparatus including: a voltage measuring portion that measures a voltage of at least one of the unit cells or a voltage of a unit cell stack formed by stacking a plurality of unit cells; and an operation state determining portion which determines that there is a possibility of the operation state being a low oxidizing gas state if the voltage measured by the voltage measuring portion is at most a first predetermined voltage, and is at least a second predetermined voltage that is smaller than the first predetermined voltage, and which determines that there is a possibility of the operation state being a low fuel gas state if the voltage measured by the voltage measuring portion is at most the second predetermined voltage.

This operation state determining apparatus measures the voltage of a unit cell or a unit cell stack. If the measured voltage is at most the first predetermined voltage and at least the second predetermined voltage, the apparatus determines that there is a possibility of the operation state being the low oxidizing gas state. If the measured voltage is at most the second predetermined voltage, the apparatus determines that there is a possibility of the operation state being the low fuel gas state. Therefore, the apparatus is able to acquire detailed knowledge of the operation state of the fuel cell battery, compared with the related-art apparatuses.

For example, the "first predetermined voltage" may be set below the range of voltages that the fuel cell battery can possibly produce during an appropriate operation state, and the "second predetermined voltage" may be set at a value which is lower than a typical value that occurs during the low oxidizing gas state, and which is higher than a typical value that occurs during the low fuel gas state, on the basis of empirical knowledge.

The operation state determining apparatus may further include an impedance measuring portion that measures an impedance of at least one of the unit cells or an impedance of the unit cell stack. In this apparatus, the operation state determining portion determines that the operation state is the dried-up state if the voltage measured by the voltage measuring portion is at most the second predetermined voltage and the impedance measured by the impedance measuring portion is not within an appropriate impedance range. Therefore, discrimination between the dried-up state and the low fuel gas state can be appropriately accomplished whereas it is difficult to accomplish the discrimination therebetween on the basis of only the measured voltage.

In the operation state determining apparatus, the operation state determining portion may determine that the operation state is the flooded state in a case where the voltage measured by the voltage measuring portion drops between the first predetermined voltage and the second predetermined voltage, and the duration of the voltage drop is short. Therefore, it becomes possible to appropriately determine whether the operation state is the flooded state by determining whether the duration of the voltage drop is short.

A further aspect of the invention is an operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising the steps of: measuring a voltage of at least one of the unit cells or a voltage of a unit cell stack formed by stacking a plurality of unit cells; and determining that there is a possibility of the operation state being a low oxidizing gas state if the voltage is at most a first predetermined voltage, and is at least a second predetermined voltage that is smaller than the first predetermined voltage, and determining that there is a possibility of the operation state being a low fuel gas state if the voltage is at most the second predetermined voltage. Therefore, the method allows acquisition of detailed knowledge of the operation state of the fuel cell battery, in comparison with the related-art methods.

BRIEF DESCRIPTION OF THE DRAWINGS

FIG. 9 is a flowchart illustrating another operation state determining process routine.

DETAILED DESCRIPTION OF PREFERRED EMBODIMENTS

Figure 1:
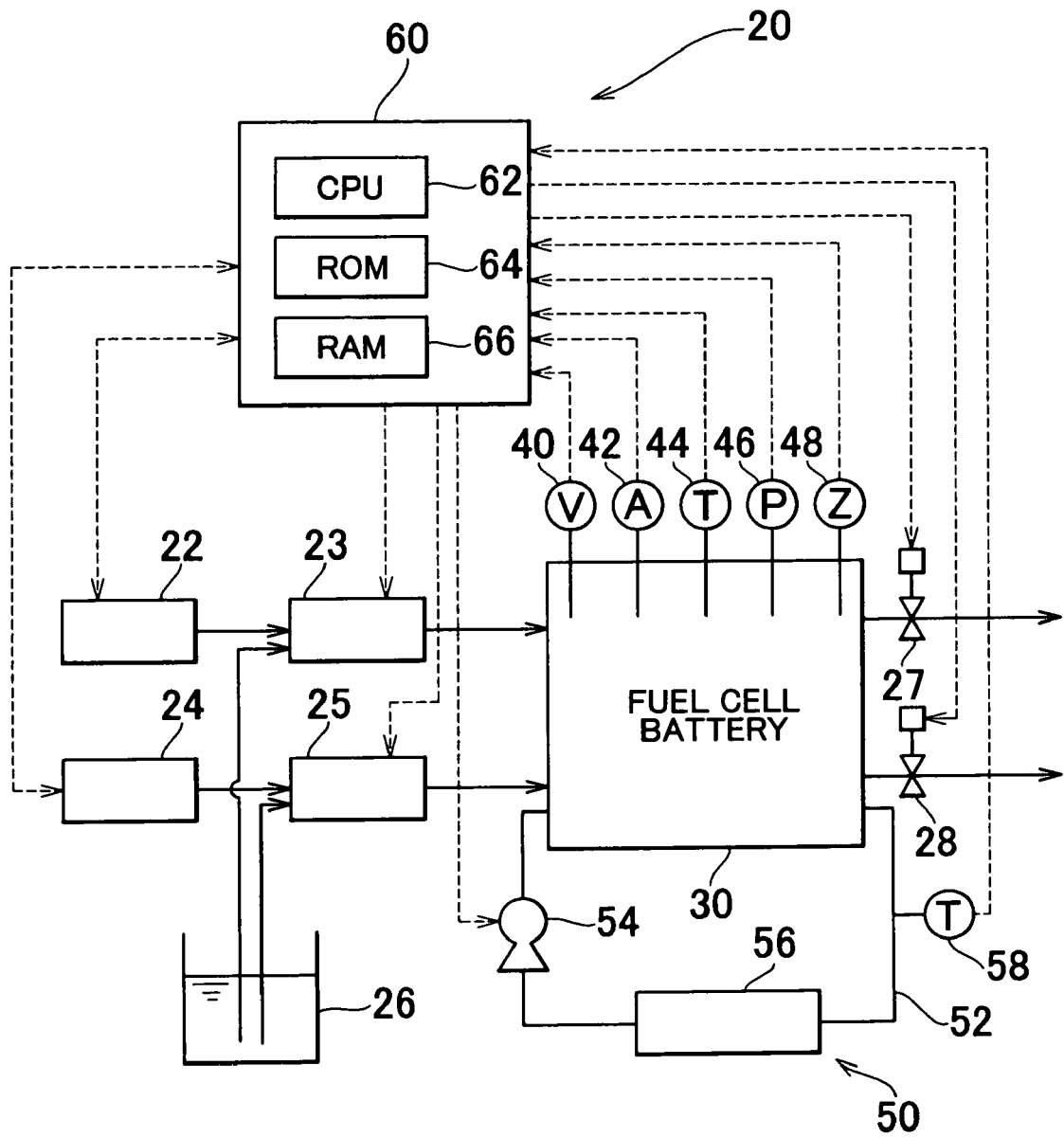
FIG. 1 is a schematic diagram illustrating the construction of a fuel cell system 20.

Preferred embodiments of the invention will be described hereinafter with reference to the accompanying drawings. FIG. 1 is a schematic diagram illustrating the construction of a fuel cell system that functions as an operation state determining apparatus in accordance with the invention. As shown in FIG. 1, a fuel cell system 20 includes a fuel gas supply device 22 that supplies a hydrogen-containing fuel gas, a fuel gas humidifier 23 that humidifies the fuel gas supplied from the fuel gas supply device 22, an oxidizing gas supply device 24 that supplies an oxygen-containing oxidizing gas (e.g., air), an oxidizing gas humidifier 25 that humidifies the oxidizing gas supplied form the oxidizing gas supply device 24, a solid polymer-type fuel cell battery 30 that generates electric power when supplied with the fuel gas and the oxidizing gas, a cooling device 50 that cools the fuel cell battery 30, and an electronic control unit 60 that controls the operation of the fuel cell system 20.

The fuel gas supply device 22 is a device that supplies a hydrogen-containing fuel gas, and may be, for example, a reformer that reforms a hydrocarbon-type fuel, such as methanol, methane or the like, and therefore supplies a hydrogen-rich fuel gas, or may be a fuel gas storage tank that stores a hydrogen-containing fuel gas. The oxidizing gas supply device 24 is a device that supplies an oxygen-containing oxidizing gas, and may be an air pump that merely supplies air, or an oxidizing gas storage tank that stores an oxidizing gas other than air. The fuel gas supply device 22 and the oxidizing gas supply device 24 are connected to the electronic control unit 60 via signal lines, so that the amount of the fuel gas supplied and the amount of the oxidizing gas supplied are controlled by the electronic control unit 60.

The fuel gas humidifier 23 and the oxidizing gas humidifier 25 are humidifiers that vaporize water pumped up from a water tank 26 and supply water vapor to the fuel gas and the oxidizing gas. The fuel gas humidifier 23 and the oxidizing gas humidifier 25 are connected to the electronic control unit 60 via signal lines, so that the amount of humidification of the fuel gas and the amount of humidification of the oxidizing gas are controlled by the electronic control unit 60.

Figure 2:
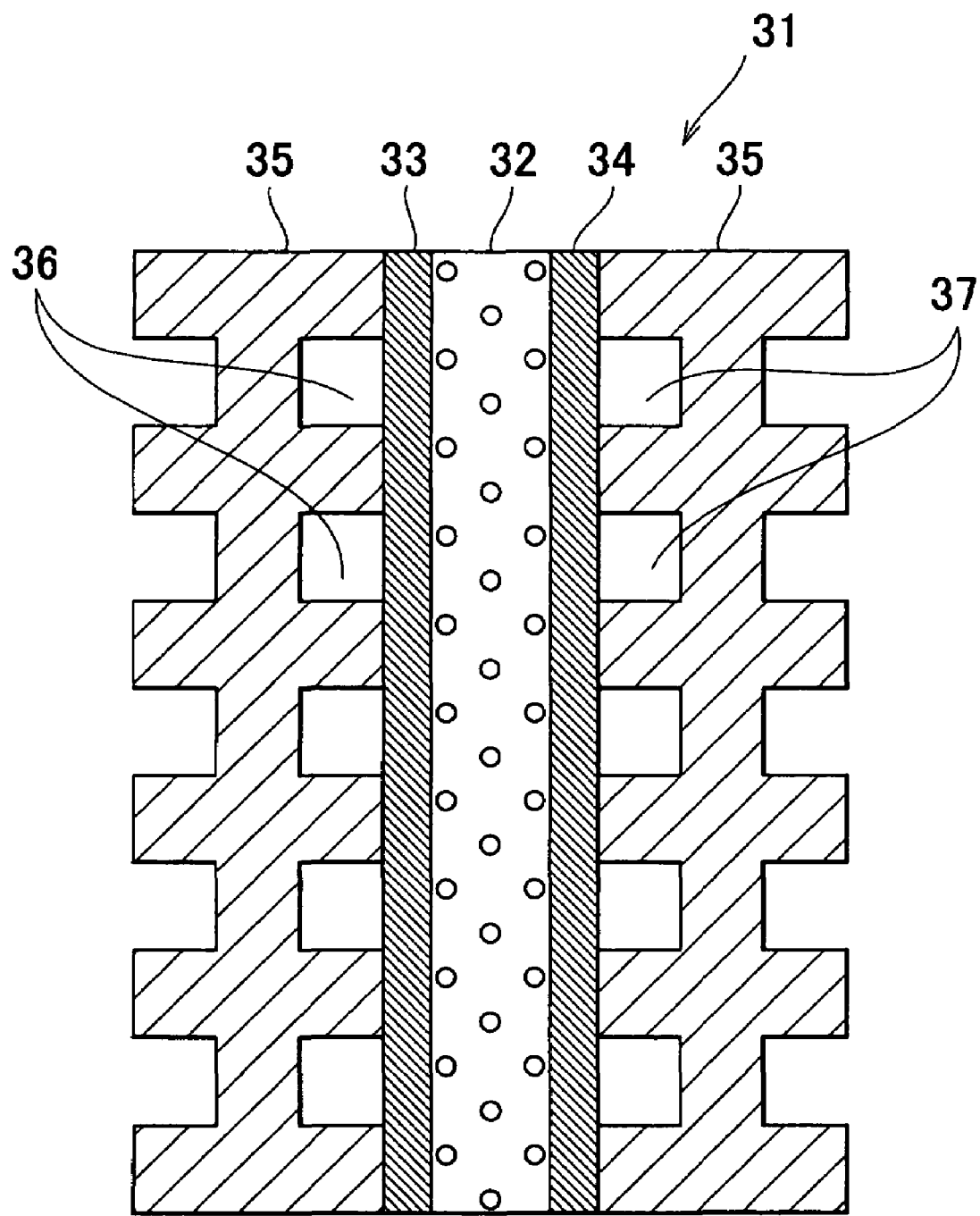
FIG. 2 is a sectional view of a unit cell 31 of a fuel cell battery 30.

The fuel cell battery 30 is a solid polymer-type fuel cell battery formed by stacking a plurality of (e.g., several hundreds of) unit cells 31. FIG. 2 schematically illustrates the construction of a unit cell 31 of the fuel cell battery 30. As shown in FIG. 2, the unit cell 31 is made up of: a solid electrolyte membrane 32 that is a proton-conductive membrane formed by a high-molecular material, such as a fluorocarbon-type resin or the like; an anode 33 and a cathode 34 which are each formed by a carbon cloth that holds therein a catalyst, such as platinum or an alloy of platinum and another metal, and which sandwich a solid electrolyte membrane 32 between the catalyst-containing surfaces and therefore form a sandwich structure, and two separators 35 which sandwich the sandwich structure from opposite sides, and form fuel gas and oxidizing gas channels 36, 37 together with the anode 33 and the cathode 34, and each of which serves as a partition wall between adjacent unit cells 31.

The fuel cell battery 30 is provided with various sensors and the like attached thereto, such as voltmeters 40 that detect the voltages V output from the unit cells 31 of the fuel cell battery 30, an ammeter 42 that detects the current I output from the fuel cell battery 30, a fuel cell temperature sensor 44 that detects the temperature of the entire fuel cell battery, a pressure sensors 46 that detect the gas pressures P of the fuel gas and the oxidizing gas, an impedance detector 48 that detects the impedance of the entire fuel cell battery, etc. These sensors and the like are connected to the electronic control unit 60 via signal lines. Known examples of the impedance detector 48 include an AC milliohm sensor that determines an impedance from the AC voltage that occurs upon application of a small alternating current to the output terminals of the fuel cell battery 30. The impedance of the fuel cell battery 30 can be roughly divided into the resistances of the anodes 33, the cathodes 34 and the separators 35, and the resistances based on the protonic conductivity of the solid electrolyte membranes 32, in view of the above-described construction of the fuel cell battery 30. Since the anodes 33, the cathodes 34 and the separators 35 are formed by elecroconductive materials, the impedance thereof does not substantially change depending on whether they are humidified. The solid electrolyte membranes 32 exhibit good protonic conductivity in a wet state, but exhibit degraded protonic conductivity in a dried-up state Therefore, the impedance of the fuel cell battery 30 reflects whether the solid electrolyte membranes 32 are in the dried-up state.

Discharge pipes of the fuel cell battery 30 for the fuel gas and the oxidizing gas are provided with pressure regulator valves 27, 28, respectively, so that the gas pressure of the fuel gas and the gas pressure of the oxidizing gas in the fuel cell battery 30 can be adjusted. Actuators of the pressure regulator valve 27, 28 are connected to the electronic control unit 60 via signal lines, and are therefore subject to the actuation control of the electronic control unit 60.

The cooling device 50 includes: a cooling water passageway 52 that includes a cooling water channel formed within the fuel cell battery 30 and a circulation passageway for supplying and discharging cooling water with respect to the cooling water channel; a heat exchanger 56 that is attached to the cooling water passageway 52 and that cools the cooling water through heat exchange with external air; a cooling water pump 54 that circulates the cooling water through in the circulation passageway; and a cooling water temperature sensor 58 that detects the temperature of cooling water in the cooling water passageway 52 near an outlet opening of the fuel cell battery 30. The cooling water pump 54 and the cooling water temperature sensor 58 are connected to the electronic control unit 60 via signal lines, so that the cooling of the fuel cell battery 30 is controlled by the electronic control unit 60. That is, the amount of circulation flow of cooling water is controlled by the electronic control unit 60 operating the cooling water pump 54 on the basis of the cooling water temperature detected by the cooling water temperature sensor 58.

The electronic control unit 60 is formed as a one-chip microprocessor that has a CPU 62 as a central component. The electronic control unit 60 is equipped with a ROM 64 that stores processing programs, a RAM 66 for temporarily storing data, and input/output ports (not shown). The electronic control unit 60 inputs, via input ports, the temperatures and the amounts of the fuel gas and the oxidizing gas supplied from the fuel gas supply device 22 and the oxidizing gas supply device 24 from thermometers, flowmeters (not shown), etc.; the states of operation of the fuel gas humidifier 23 and the oxidizing gas supply device 24; the voltages V output by the fuel cell battery 30 from the voltmeters 40; the current I output by the fuel cell battery 30 from the ammeter 42; the temperature of the fuel cell battery 30 from the fuel cell temperature sensor 44; the gas pressures P of the fuel gas and the oxidizing gas of the fuel cell battery 30 from the pressure sensors 46; the impedance Z of the fuel cell battery 30 from the impedance detector 48; the temperature of the cooling water from the cooling water temperature sensor 58; etc. The electronic control unit 60 outputs, via output ports, driving signals to the fuel gas supply device 22 and the oxidizing gas supply device 24, driving signals to the fuel gas humidifier 23 and the oxidizing gas humidifier 25, driving signals to the cooling water pump 54, etc.

A fuel cell system 20 constructed as described above was steadily operated with a constant load current (Io) in various states that were forcibly created, that is, a dried-up state, a flooded state, a low fuel gas state, and a low oxidizing gas state. During the operations, the output voltage V of each unit cell 31 of the fuel cell battery 30 and the impedance Z of the entire fuel cell battery were measured. FIGS. 3 to 6 are graphs indicating changes in the voltages V of unit cells 31 (also referred to as "cell voltage") with respect to time during the aforementioned operation, states. That is, each of the graphs indicates time-dependent changes in the output voltages V of stacked unit cells 31 during a specific state of operation. The measurement was conducted every 1 sec.

Figure 3:
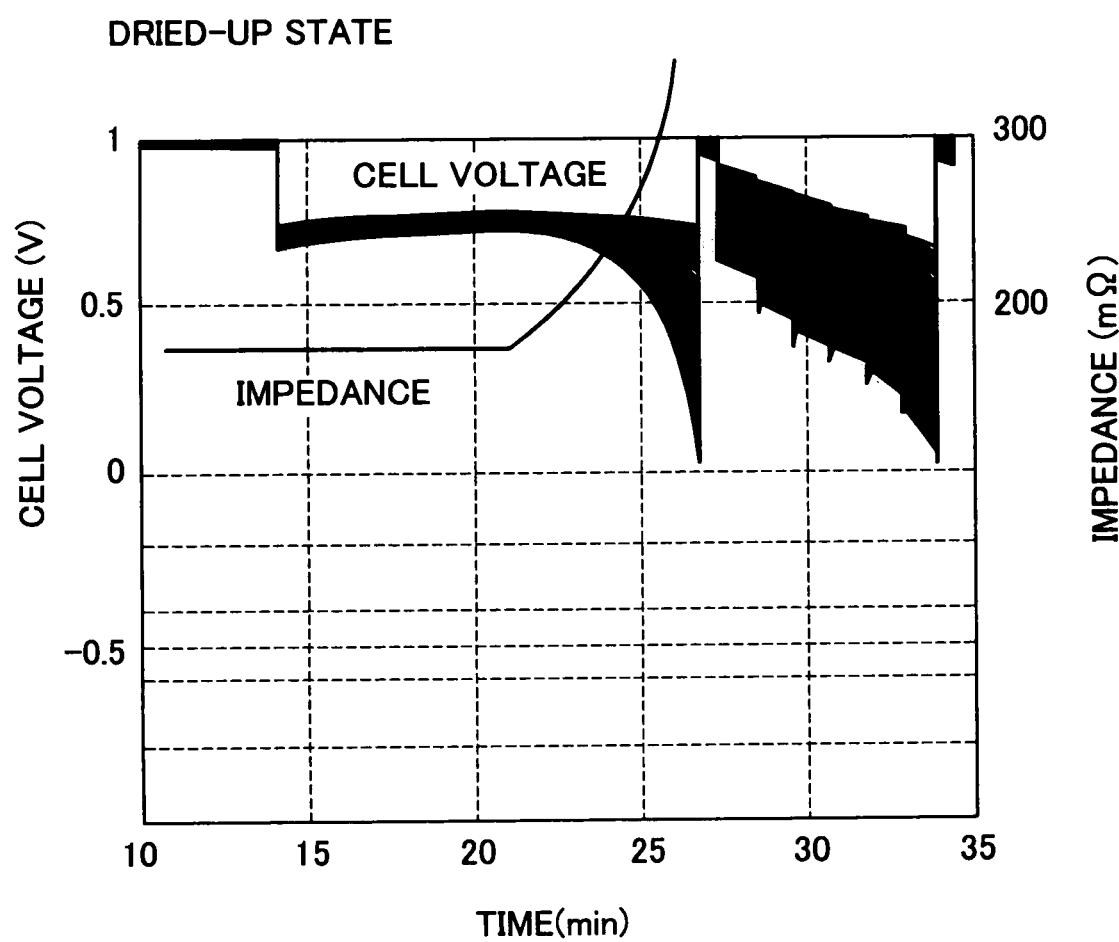
FIG. 3 is a graph indicating the voltage V with respect to time during a dried-up state.

The dried-up state was forcibly brought about by reducing the amount of humidification from a normal level and by raising the temperature of the entire fuel cell battery by curbing the cooling performed by the cooling device 50. FIG. 3 indicates time-dependent changes in the output voltage V of each unit cell 31 during the dried-up state. As can be seen from FIG. 3, during the dried-up state, the output voltage V of each unit cell 31 sharply dropped, and some unit cells 31 reached a minus region generally termed reverse potential. The impedance Z of the entire fuel cell battery rose to at least three times a normal level due to a deterioration in the protonic conductivity caused by the change from the wet state to the dried state of the solid electrolyte membranes 32.

Figure 4:
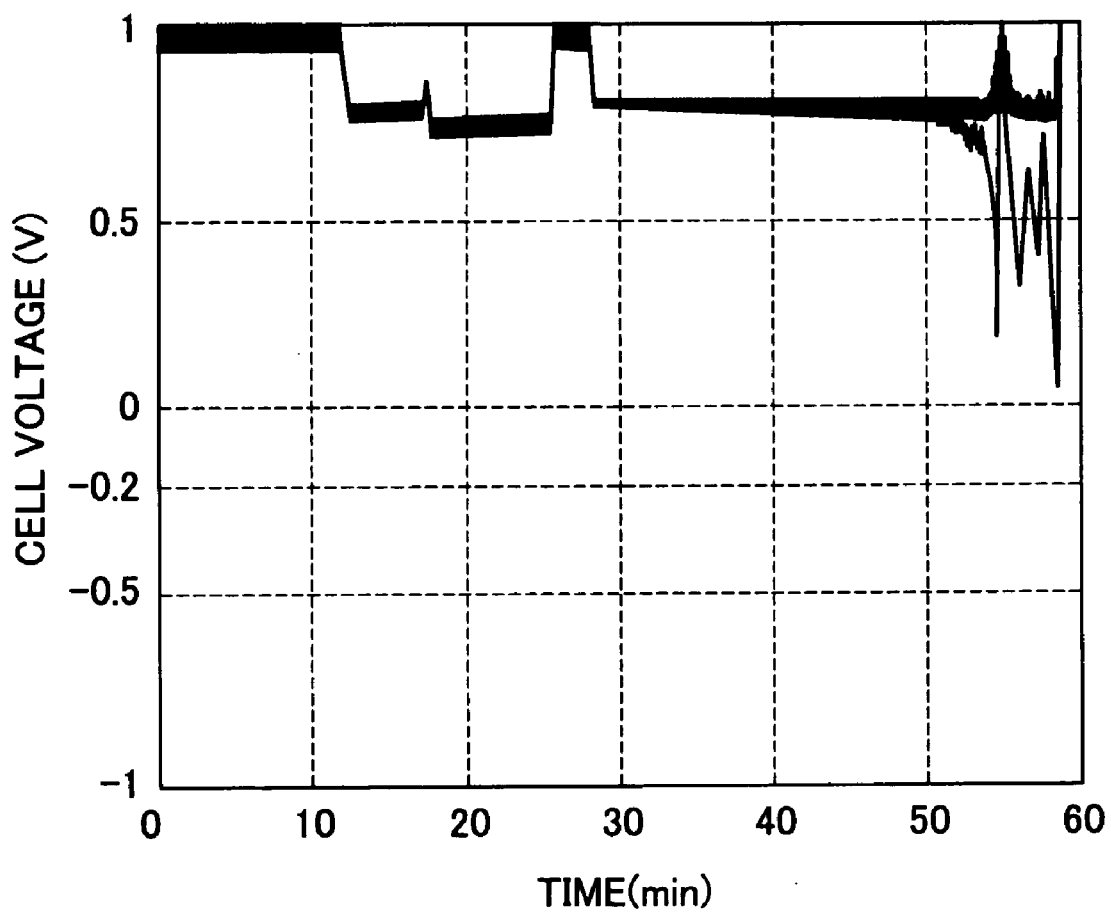
FIG. 4 is a graph indicating the voltage V with respect to time during a flooded state.

The flooded state was forcibly brought about by increasing the amount of humidification from a normal level and by reducing the temperature of the entire fuel cell battery through the sufficient cooling performed by the cooling device 50. FIG. 4 indicates the time-dependent changes in the output voltage V of each unit cell 31 during the flooded state. As can be seen from FIG. 4, during the flooded state, the output voltage V of each unit cell 31 sharply dropped as time elapsed, but no unit cell 31 reached the minus region. Each voltage drop was immediately followed by a rise. Thus, the duration of the voltage drop was short. The occurrence of the short duration may be explained as follows. That is, it is considered that the output voltages V of unit cells 31 dropped due to accumulation of water in the channels 36, 37 of the separators 35 of the unit cells 31, and then rose as the water was carried away by gas. It is to be noted herein that during the flooded state, the impedance of the entire fuel cell battery exhibited no difference from the impedance during an appropriate operation state.

Figure 5:
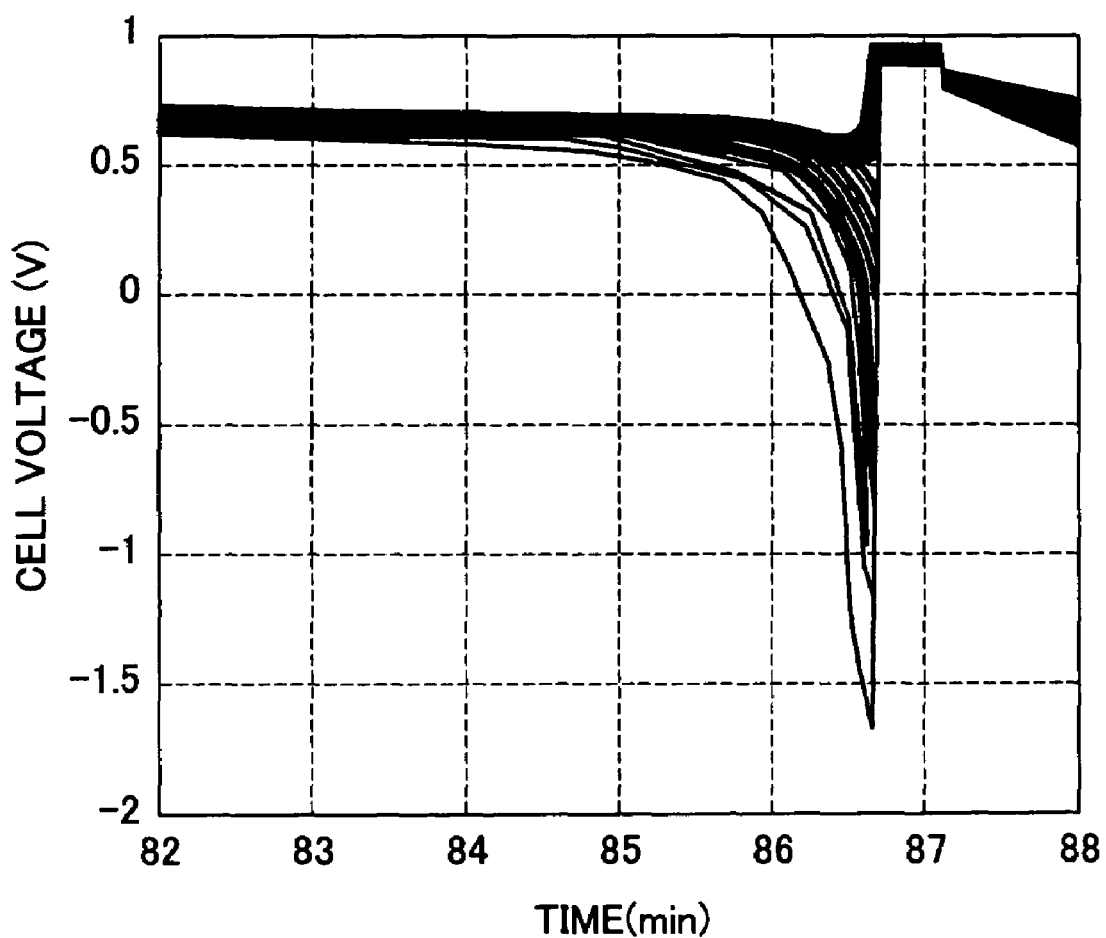
FIG. 5 is a graph indicating the voltage V with respect to time during a low fuel gas state.

The low fuel gas state was forcibly brought about by setting the supplied amount of the fuel gas so that hydrogen fell short of a stoichiometric value determined for the electrochemical reaction between hydrogen and oxygen. FIG. 5 indicates the time-dependent changes in the output voltage V of each unit cell 31 during the low fuel gas state. As can be seen from FIG. 5, during the low fuel gas state, the output voltage V of each unit cell 31 sharply dropped, and fell into the minus region. This pattern of changes in the output voltages V is remarkably similar to the pattern of changes during the dried-up state. It is also noted herein that during the low fuel gas state, the impedance of the entire fuel cell battery exhibited no difference from the impedance occurring during an appropriate operation state.

Figure 6:
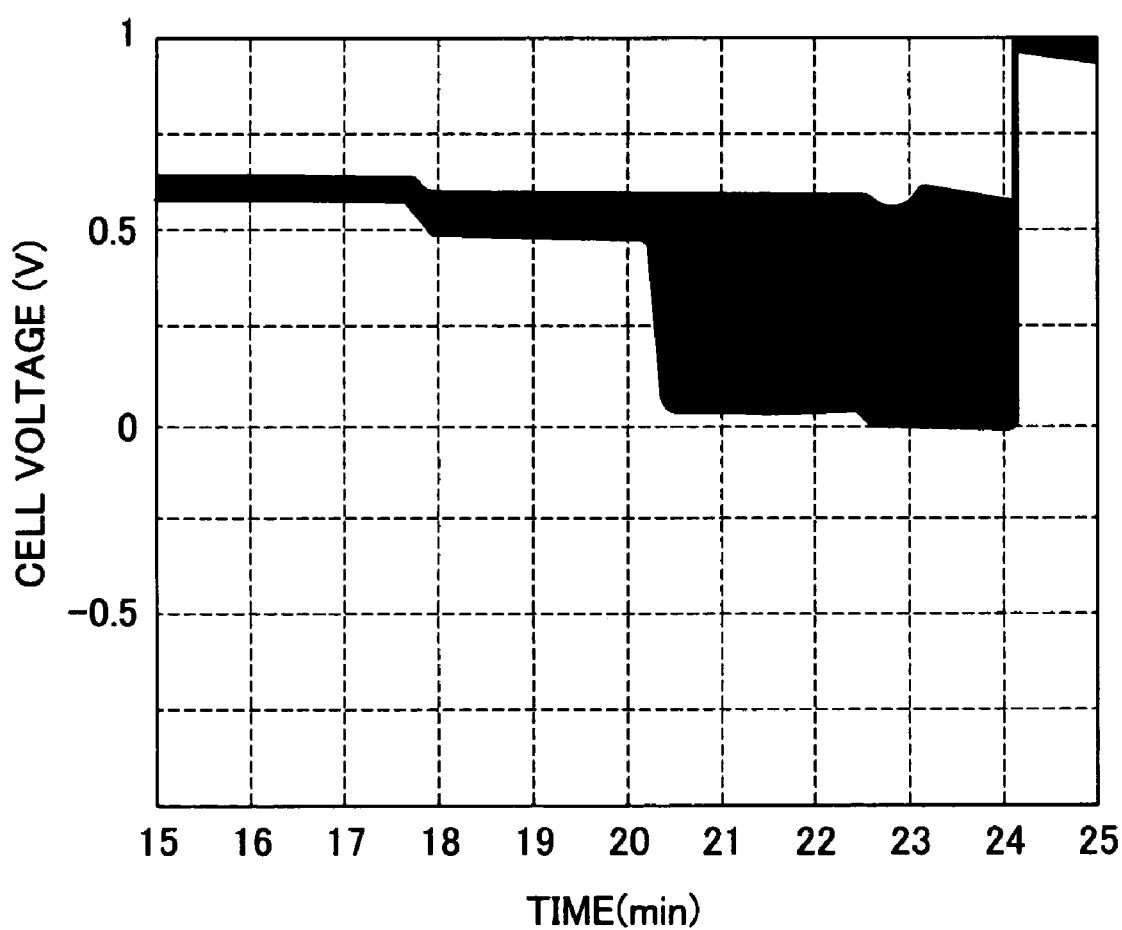
FIG. 6 is a graph indicating the voltage V with respect to time during a low oxidizing gas state.

The low oxidizing gas state was forcibly brought about by setting the supplied amount of the oxidizing gas so that oxygen fell short of a stoichiometric value determined for the electrochemical reaction between hydrogen and oxygen. FIG. 6 indicates the time-dependent changes in the output voltage V of each unit cell 31 during the low oxidizing gas state. As can be seen from FIG. 6, during the low oxidizing gas state, the output voltage V of each unit cell 31 temporarily reduced with the elapse of time, but did not reach the minus region. The output voltage V of each unit cell 31 was stable at the dropped value for a while, and then started to increase. It is to be noted that during the low oxidizing gas state, the impedance of the entire fuel cell battery exhibited no difference from the impedance occurring during an appropriate operation state.

The above-described experiments indicate as follows. That is, the dried-up state and the low fuel gas state are similar in the behaviors of the output voltages V of the unit cells 31 with respect to time. That is, during the dried-up state and during the low fuel gas state, the output voltage V of the unit cells 31 reduce into the minus region or a vicinity of the minus region. However, the dried-up state sees an abnormal rise in the impedance of the entire fuel cell battery whereas such a phenomenon is not observed during the low fuel gas state. During the flooded state and during the low oxidizing gas state, the output voltage V of each unit cell 31 does not reduce into the minus region. During the flooded state, the duration of the drop in the output voltages V of the unit cells 31, is short. In contrast, during the low oxidizing gas state, such the duration is long. Therefore, on the basis of these findings, it becomes possible to acquire detailed knowledge of a specific operation state of a fuel cell battery if the fuel cell battery is in an inappropriate operation state.

Figure 7:
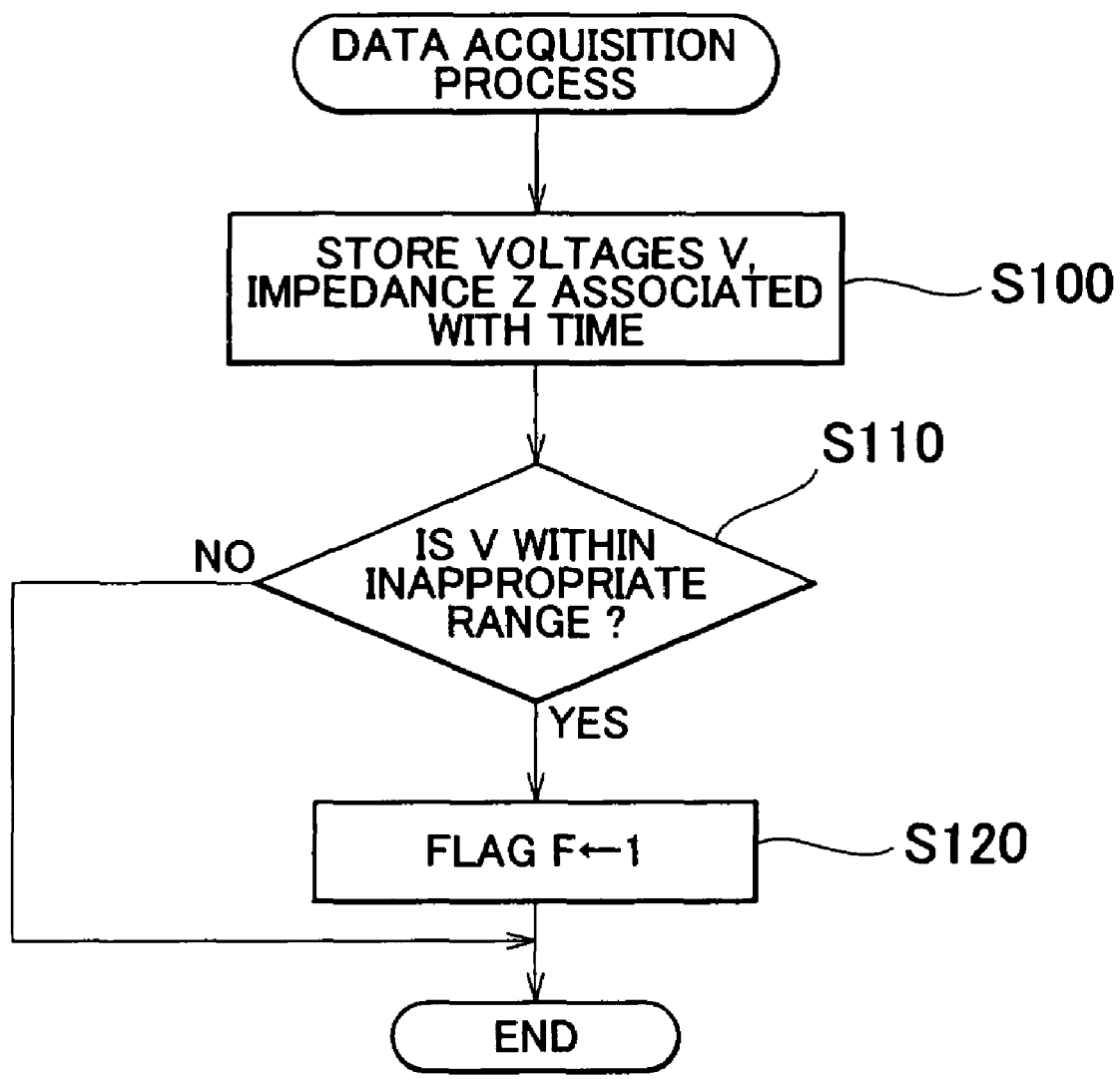
FIG. 7 is a flowchart illustrating a data acquisition process routine.
Figure 8:
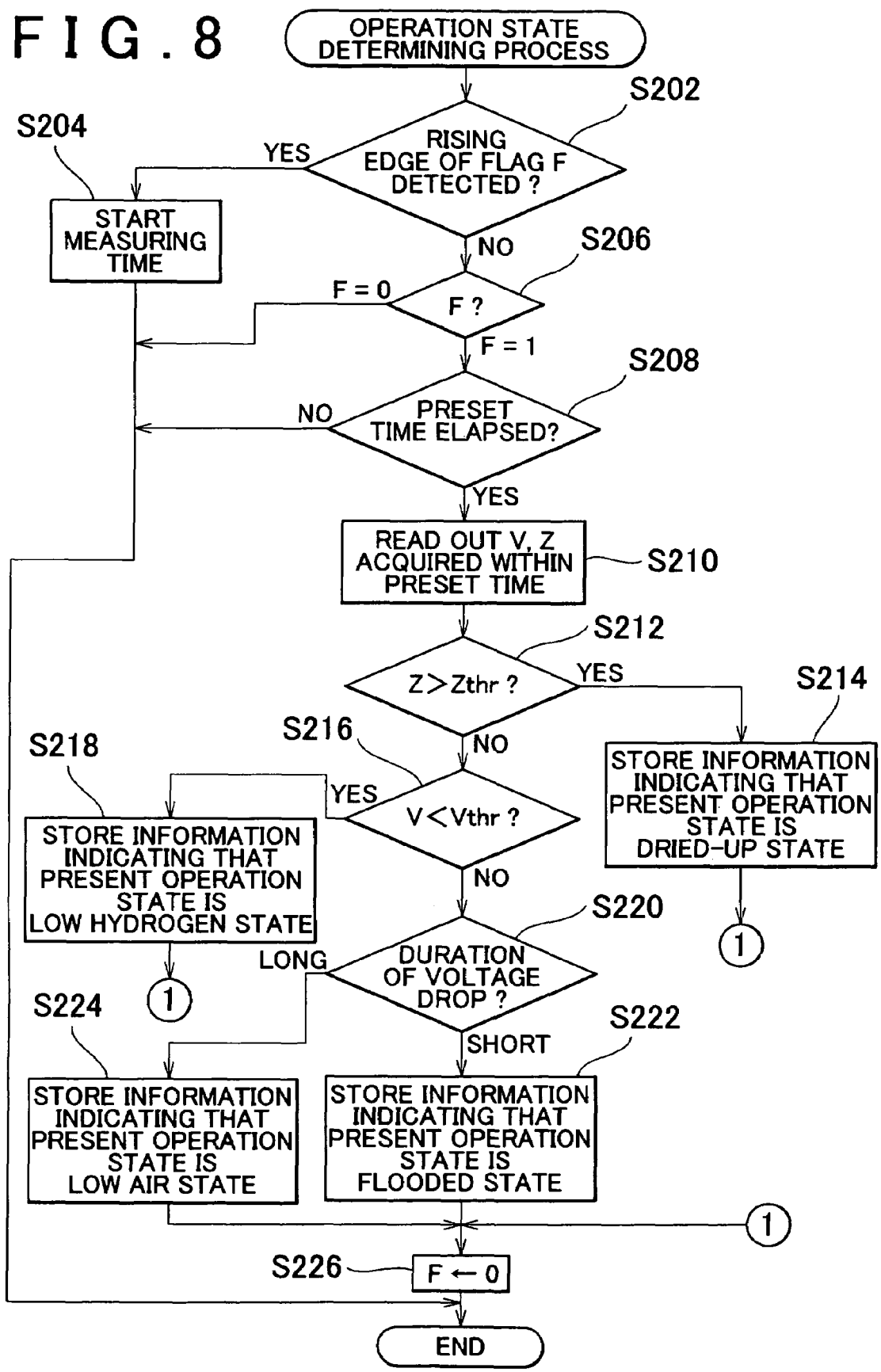
FIG. 8 is a flowchart illustrating an operation state determining process routine.

Next described will be operations of the fuel cell system 20 constructed as described above and, more particularly, a process of determining the state of operation of the fuel cell battery 30 and a data acquisition process of acquiring data needed for the determining process. FIG. 7 is a flowchart illustrating a data acquisition process routine executed by the electronic control unit 60 of the fuel cell system 20. FIG. 8 is a flowchart illustrating an operation state determining process routine.

Firstly, the data acquisition process routine will be described. This routine is; repeatedly executed at every predetermined time (e.g., 1 sec) during a period that starts immediately following a startup of the fuel cell system 20 and ends when the operation of the fuel cell system 20 is stopped. When the data acquisition process routine is executed, the CPU 62 acquires the voltage V of each unit cell 31 from the voltmeter 40 of each cell 31, and acquires the impedance Z of the entire fuel cell battery from the impedance detector 48, and associates the acquired voltages V and the acquired impedance Z with the present time, and stores them into the RAM 66 (step S100). Subsequently, it is determined whether any one of the voltages V acquired in step S100 is within a predetermined inappropriate range (step S110). If none of the voltages V is within the inappropriate range, the routine is immediately ended. Conversely, if any one of the voltages V is within the inappropriate range, a flag F is set at a value "1" (step S120), and then the routine is ended. The inappropriate range of the voltage is a low voltage range (e.g., less than or equal to 0.3 [V]) that can never be entered during an appropriate operation state but that can be entered if the state of operation becomes inappropriate. The inappropriate range of the voltage is set on the basis of empirically obtained data. The flag F is set at a value "1" when the state of operation becomes inappropriate. Then, the flag F is reset to a value "0" after it has been determined in the below-described operation state determining process which one of the dried-up state, the flooded state, the low fuel gas state and the low oxidizing gas state is the present state of operation.

The operation state determining process routine will next be described. This routine is repeatedly executed at every predetermined time (e.g., 1 min) during a period that starts immediately following a startup of the fuel cell system 20 and ends when the operation of the fuel cell system 20 is stopped. When the operation state determining process routine is executed, it is determined whether a rising edge of the flag F from the value. "0" to the value "1" has been detected (step S202). If a rising edge is detected, the time measurement via a timer (not shown) is started (S204), and then the routine is ended. Conversely, if a rising edge is not detected, the value of the flag F is checked (step S206). If the value of the flag F is "0", it is indicated that the operation state is appropriate, and therefore the routine is ended. If the value of the flag F is "1", it is indicated that a rising edge of the flag F was detected before and the time measurement has started. Therefore, it is determined whether a predetermined time for determination (e.g., several minutes) has elapsed following the start of the time measurement (S208). If the determination time has not elapsed, the routine is immediately ended. It is to be noted herein that the determination time is a time interval that is needed in order to determine which one of the dried-up state, the flooded state, the low fuel gas state and the low oxidizing gas state is the present state, and is predetermined on the basis of empirical data. Until the elapse of the determination time, the data acquisition process routine illustrated in FIG. 7 is repeatedly executed. Therefore, the detected voltages V and impedances Z are associated with time and are stored in the RAM 66.

If it is determined in step S208 that the predetermined determination time has elapsed, the data acquired in the data acquisition process routine within the determination time, that is, the voltages V and the impedances Z, are read out (step S210), and then it is determined whether any one of the impedances Z read out is greater than a predetermined threshold value Zthr (step S212). It is to be noted herein that the threshold value Zthr is set beforehand so that the threshold value Zthr is less than the impedance that occurs when the dried-up state is forcibly created, and is greater than the impedances occurring during the other operation states. If it is determined in step S212 that the read-out impedances Z include an impedance Z that is greater than the threshold value Zthr, information indicating that the present state is the dried-up state is stored into the RAM 66 (step S214). After that, the flag F is reset (step S226), and the routine is ended.

Conversely, if it is determined in step S212 that none of the impedances Z is greater than the threshold value Zthr, it is determined whether any one of the voltages V read out in step S210 is less than a threshold value Vthr (step S216). It is to be noted herein that the threshold value Vthr is set beforehand than the threshold value Vthr is greater than the voltage V occurring when the low fuel gas state is forcibly created, and is less than the voltages V occurring during the low oxidizing gas state or the flooded state. Specifically, the threshold value Vthr is set at a value that is less than or equal to 0 [V], and is preferably set at a value within the range of −0.2 to 0 [V]. In this embodiment, the threshold value Vthr is set at −0.1 [V]. If it is determined in step S216 that the read-out voltages V include a voltage V that is less than the threshold value Vthr, information indicating that the present operation state is the low fuel gas state, that is, a low hydrogen state, is stored into the RAM 66 (step S218). After that, the flag F is reset (step S226), and then the routine is ended.

Conversely, if it is determined in step S216 that none of the voltages V is less than the threshold value Vthr, it is determined whether the duration of the voltages V of each unit cell 31 read out in step S210 is short or long (step S220). In a possible process, as for an example, the voltage V of a unit cell 31 acquired in the previous execution of the data acquisition process routine is subtracted from the voltage V of the same unit cell 31 acquired in the present execution of the routine so as to determine a difference $\Delta V$. The difference $\Delta V$ is divided by a time difference $\Delta t$ between the previous execution and the present execution of the routine, thereby determining $\Delta V/\Delta t$. A time width from the time point of the value $\Delta V/\Delta t$ becoming smaller than a predetermined negative value to the time point of the value $\Delta V/\Delta t$ becoming greater than a predetermined positive value is calculated. The time width is regarded as the duration of the voltage drop. In this case, it is appropriate to determine the negative value and the positive value on the basis of empirical data. The $\Delta V/\Delta t$ can be regarded as a time derivative of the voltage V. It is also possible to calculate a time width from the time point of the voltage V becoming smaller than a predetermined determination voltage to the time point of the voltage V becoming greater than the determination voltage, and to regard the time width as the duration of the voltage drop. It is appropriate to determine the determination voltage on the basis of empirical data.

If it is determined in step S220 that the duration of the voltage drop is long, information indicating that the present operation state is the flooded state is stored into the RAM 66 (step S222). Conversely, if it is determined in step S220 that the duration of the voltage drop is long, information indicating that the present operation state is the low oxidizing gas state, that is, a low air state, is stored into the RAM 66

(step S224). After step 222 or step S224, the flag F is reset (step S226), and then the routine is ended.

After the operation state determining process routine has ended, the CPU 62 may output the operation state from the kAM 66 to a display (not shown), or may print the operation state from the RAM 66 via a printer (not shown). The CPU 62 may also change the conditions of operation of the fuel cell battery 30 on the basis of the operation state stored in the RAM 66. For example, if the operation state stored is the dried-up state, the amounts of humidification provided by the fuel gas humidifier 23 and the oxidizing gas humidifier 25 may be increased, or the temperature of the entire fuel cell battery may be reduced by increasing the amount of ejection from the cooling water pump 54 of the cooling device 50. If the operation state stored is the flooded state, the amounts of humidification provided by the fuel gas humidifier 23 and the oxidizing gas humidifier 25 may be reduced, or the temperature of the entire fuel cell battery may be increased by reducing the amount of ejection from the cooling water pump 54 of the cooling device 50, or the gas pressures may be temporarily raised and then reduced by operating the pressure regulator valves 27, 28. If the operation state stored in the RAM 66 is the low fuel gas state, the amount of the fuel gas supplied may be increased by operating the fuel gas supply device 22. If the operation state stored is the low oxidizing gas state, the amount of the oxidizing gas supplied may be increased by operating the oxidizing gas supply device 24. Instead of or in addition to these operations, the load current may be reduced.

According to the fuel cell system 20 described in detail above, the impedance Z of the entire fuel cell battery is measured and the voltages V of the individual unit cells 31 are measured. On the basis of the impedance Z and the voltages V, it is determined which one of the low fuel gas state, the low oxidizing gas state, the flooded state and the dried-up state is the present operation state. Therefore, detailed knowledge of the operation state of the fuel cell battery can be acquired in comparison with the case where the operation state is determined on the basis of only the impedance Z or the case where the operation state is determined on the basis of only the voltages V.

Furthermore, the fuel cell system 20 determines which one of the low fuel gas state, the low oxidizing gas state, the flooded state and the dried-up state is the present operation state on the basis of the impedances Z and the voltages V measured during the period of a predetermined determination time after it has been that a value of the voltage V of a unit cell 31 is within the inappropriate voltage range. Thus, changes in voltage with time are considered so as to appropriately determine the operation state.

Furthermore, in the system 20, it is determined that the fuel cell battery cell is in the dried-up state if the impedance Z of the entire fuel cell battery is greater than the threshold value Zthr. Therefore, it becomes possible to make an appropriate discrimination between the dried-up state and the low fuel gas state, which is difficult to make if the basis for the discrimination is only the voltage V. If the impedance Z of the entire fuel cell battery does not exceed the threshold value Zthr, but is appropriate, it can be appropriately determined which one of the low fuel gas state, the low oxidizing gas state and the flooded state is the present operation state. Specifically, it is appropriately determined that the present operation state is the low fuel gas state if a voltage V is lower than the threshold value Vthr. If not, the duration of the drop in the voltage V is checked. If the duration is short, it is determined that the present operation state is the flooded state. If the duration is long, it is determined that the present operation state is the low oxidizing gas state.

The above-described embodiment may be interpreted as follows. That is, in the determination in step S110 as to whether a voltage V is within the predetermined inappropriate range, it is determined whether the voltage V is equal to or less than a first predetermined voltage (e.g., 0.3 [V]). If the answer to step S110 is affirmative, it is then determined in step S216 whether any one of the plurality of voltages V is lower than the threshold value Vthr, that is, a second predetermined voltage. If the answer to step S216 is affirmative, it is determined that there is a possibility of the low fuel gas state. If the answer to step S216 is negative, it is determined that there is a possibility of the low oxidizing gas state.

It is to be understood that the invention is not restricted by the foregoing embodiment in any manner, but can be embodied in various forms within the technical scope and spirit of the invention.

For example, in the operation state determining process routine of the foregoing embodiment, the comparison of the impedance Z with the threshold value Zthr (step S212) is followed by the comparison of the voltages V with the threshold value Vthr (step S216). However, the order may be reversed, that is, the comparison of the voltages V with the threshold value Vthr may be executed before the comparison of the impedance Z with the threshold value Zthr. More specifically, as illustrated in FIG. 9, after the process of steps S202 to S210 is executed, it is determined whether any one of the voltages V read out is lower than the threshold value Vthr (step S252). If there is a voltage V below the threshold value Vthr, it is subsequently determined whether any one of the impedances Z read out is greater than the threshold value Zthr (step S254). If there is an impedance Z above the threshold value Zthr, information indicating that the present operation state is the dried-up state is stored into the RAM 66 (step S256). After that, the flag F is reset (step S226), and then the routine is ended. Conversely, if the read-out impedances Z do not include an impedance Z that exceeds the threshold value Zthr, information indicating that the present operation state is the low fuel gas state is stored into the RAM 66 (step S258). After that, the flag F is reset (step S226), and then the routine is ended. If it is determined in step S252 that the read-out voltages V do not include a voltage V that is lower than the threshold value Vthr, the above-described process of step S220 and the subsequent steps is executed. Substantially the same advantages as those of the foregoing embodiment will be achieved if the operation state determining process routine illustrated in FIG. 9 is executed. The routine of FIG. 9 can be interpreted as follows. That is, if a voltage V is within the inappropriate voltage range and is below the threshold value, it is determined that the operation state is the low fuel gas state or the dried-up state. If a voltage V is within the inappropriate voltage range and is above the threshold value Vthr, it is determined that the operation state is the low oxidizing gas state or the flooded state.

Still further, although in the foregoing embodiment, the voltage V of each unit cell 31 is measured, and is compared with the threshold value Vthr, it is also possible to measure the voltage of at least one unit cell 31 selected from the stacked unit cells 31 and compare the measured voltage with a threshold value. Furthermore, it is possible to measure the voltage of a unit cell module of a plurality of unit cells 31 and compare the measured voltage with a threshold value. It is also possible to measure the voltage of the entire fuel cell battery and compare the measured voltage with a threshold value.

Although in the foregoing embodiment, the impedance Z of the entire fuel cell battery is measured, and is compared with the threshold value Zthr, it is also possible to measure the impedance of each unit cell 31 and compare the measured impedance with a threshold value. Furthermore, it is possible to measure the impedance of at least one unit cell 31 selected from the stacked unit cells 31 and compare the measured impedance with a threshold value. It is also possible to measure the impedance of a unit cell module of a plurality of unit cells 31 and compare the measured impedance with a threshold value.

The above-described fuel cell system 20 may be applied to fuel cell vehicles and co-generation systems, and may also be applied in any other use.

What is claimed is:

1. An operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising:
   a voltage measuring portion that measures a voltage of at least one of the unit cells or a voltage of a unit cell stack formed by stacking a plurality of unit cells; and
   an operation state determining portion which determines that the operation state of the fuel cell is a first operation state that is one of a low fuel gas state and a dried-up state if the voltage measured by the voltage measuring portion is within a predetermined inappropriate voltage range, and is below a predetermined voltage that is pre-set at a low value that is substantially impossible during a low oxidizing gas state and during a flooded state, and which determines that the operation state of the fuel cell is a second operation state that is one of the low oxidizing gas state and the flooded state if the voltage measured by the voltage measuring portion is within the inappropriate voltage range, and is above the predetermined voltage.

2. The operation state determining apparatus according to claim 1, wherein the operation state determining portion determines which one of the first operation state and the second operation state is the operation state based on voltages measured by the voltage measuring portion a plurality of times during a period of a predetermined determination time after it is determined that a voltage measured by the voltage measuring portion is within the inappropriate voltage range.

3. The operation state determining apparatus according to claim 1, wherein if the operation state is the second operation state, the operation state determining portion determines that the operation state is the flooded state, when the voltage drops and the duration of that voltage drop is short, and the operation state determining portion determines that the operation state is the low oxidizing gas state, when the duration is long.

4. The operation state determining apparatus according to claim 1, further comprising an impedance measuring portion that measures an impedance of at least one of the unit cells or an impedance of the unit cell stack,
   wherein if the operation state of the fuel cell is the first operation state and the impedance measured by the impedance measuring portion is not within a predetermined appropriate impedance range, the operation state determining portion determines that the operation state is the dried-up state, and wherein if the operation state of the fuel cell is the first operation state and the impedance measured by the impedance measuring portion is within the predetermined appropriate impedance range, the operation state determining portion determines that the operation state is the low fuel gas state.

5. The operation state determining apparatus according to claim 1, wherein the predetermined voltage is set at a value that is at most 0 [V].

6. An operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising:
   (a) the step of determining whether a voltage of at least one of the unit cells or a voltage of a unit cell stack formed by stacking a plurality of unit cells is within a predetermined inappropriate voltage range;
   (b) the step of determining whether the voltage is below a predetermined voltage that is pre-set at a low value that is substantially impossible during a low oxidizing gas state and during a flooded state; and
   (c) the step of determining that the operation state of the fuel cell is a first operation state that is one of a low fuel gas state and a dried-up state if the voltage is within the inappropriate voltage range, and is below the predetermined voltage, and determining that the operation state of the fuel cell is a second operation state that is one of the low oxidizing gas state and the flooded state if the voltage is within the inappropriate voltage range, and is above the predetermined voltage.

7. The operation state determining method according to claim 6, further comprising (d) the step of determining whether an impedance of at least one of the unit cells or an impedance of the unit cell stack is within a predetermined appropriate impedance range,
   wherein, in the step (c), if the operation state of the fuel cell is the first operation state and the impedance is not within a predetermined appropriate impedance range, it is determined that the operation state is the dried-up state, and wherein, in the step (c), if the operation state of the fuel cell is the first operation state and the impedance is within the predetermined appropriate impedance range, it is determined that the operation state is the low fuel gas state.

8. An operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising:
   an impedance measuring portion that measures an impedance of at least one of the unit cells or an impedance of a unit cell stack formed by stacking a plurality of unit cells;
   a voltage measuring portion that measures a voltage of at least one of the unit cells or a voltage of the unit cell stack; and
   an operation state determining portion that determines which one of a low fuel gas state, a low oxidizing gas state, a flooded state and a dried-up state is the operation state by determining which operation state corresponds to the impedance measured by the impedance measuring portion and the voltage measured by the voltage measuring portion, and wherein the operation state determining portion determines that the operation state is the low fuel gas state if the impedance measured by the impedance measuring portion is an appropriate impedance and the voltage measured by the voltage measuring portion is below a predetermined voltage that is pre-set at a low value that is substantially impossible during the low oxidizing gas state and during the flooded state.

9. The operation state determining apparatus according to claim 8, wherein the operation state determining portion determines which one of the low fuel gas state, the low oxidizing gas state, the flooded state and the dried-up state is the operation state by determining which operation state corresponds to impedances measured by the impedance measuring portion a plurality of times and voltages measured by the voltage measuring portion a plurality of times during a period of a predetermined determination time after it is determined that a voltage measured by the voltage measuring portion is within a predetermined inappropriate voltage range.

10. The operation state determining apparatus according to claim 8, wherein if the impedance measured by the impedance measuring portion is the appropriate impedance, the operation state determining portion determines which one of the low fuel gas state, the low oxidizing gas state and the flooded state is the operation state of the fuel cell based on the voltage measured by the voltage measuring portion.

11. The operation state determining apparatus according to claim 8, wherein the predetermined voltage is set at a value that is at most 0 [V].

12. The operation state determining apparatus according to claim 8, wherein the operation state determining portion determines that the operation state of the fuel cell is the flooded state in a case where the voltage measured by the voltage measuring portion drops into a predetermined inappropriate voltage range, but remains above a predetermined voltage that is pre-set at a low value that is substantially impossible during the low oxidizing gas state and during the flooded state, and the duration of the voltage drop is short.

13. The operation state determining apparatus according to claim 8, wherein the operation state determining portion determines that the operation state of the fuel cell is the low oxidizing gas state in a case where the voltage measured by the voltage measuring portion drops into a predetermined inappropriate voltage range, but remains above a predetermined voltage that is pre-set at a low value that is substantially impossible during the low oxidizing gas state and during the flooded state, and the duration of the voltage drop is long.

14. An operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising the steps of:
measuring an impedance of at least one of the unit cells or an impedance of a unit cell stack formed by stacking a plurality of unit cells;
measuring a voltage of at least one of the unit cells or a voltage of the unit cell stack; and
determining which one of a low fuel gas state, a low oxidizing gas state, a flooded state and a dried-up state is the operation state by determining which operation state corresponds to the impedance and the voltage, wherein the operation state is determined to be the low fuel gas state if the impedance measured by the impedance measuring portion is an appropriate impedance and the voltage measured by the voltage measuring portion is below a predetermined voltage that is pre-set at a low value that is substantially impossible during the low oxidizing gas state and during the flooded state.

15. An operation state determining apparatus for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising:
a voltage measuring portion that measures a voltage of at least one of the unit cells or a voltage of a unit cell stack formed by stacking a plurality of unit cells; and
a operation state determining portion which determines that there is a possibility of the operation state being a low oxidizing gas state if the voltage measured by the voltage measuring portion is at most a first predetermined voltage, and is at least a second predetermined voltage that is smaller than the first predetermined voltage, and which determines that there is a possibility of the operation state being a low fuel gas state if the voltage measured by the voltage measuring portion is at most the second predetermined voltage.

16. The operation state determining apparatus according to claim 15, further comprising an impedance measuring portion that measures an impedance of at least one of the unit cells or an impedance of the unit cell stack,
wherein the operation state determining portion determines that the operation state is the dried-up state if the voltage measured by the voltage measuring portion is at most the second predetermined voltage and the impedance measured by the impedance measuring portion is not within an appropriate impedance range.

17. The operation state determining apparatus according to claim 15, wherein the operation state determining portion determines that the operation state of the fuel cell is the flooded state in a case where the voltage measured by the voltage measuring portion drops between the first predetermined voltage and the second predetermined voltage, and the duration of the voltage drop is short.

18. An operation state determining method for determining an operation state of a fuel cell battery formed by stacking a plurality of unit cells each having a construction in which a wet-state solid electrolyte membrane is sandwiched between an anode that is supplied with a fuel gas and a cathode that is supplied with an oxidizing gas, comprising the steps of:
measuring a voltage of at least one of the unit cells or a voltage of a unit cell stack formed by stacking a plurality of unit cells; and
determining that there is a possibility of the operation state being a low oxidizing gas state if the voltage is at most a first predetermined voltage, and is at least a second predetermined voltage that is smaller than the first predetermined voltage, and determining that there is a possibility of the operation state being a low fuel gas state if the voltage is at most the second predetermined voltage.

* * * * *